Oct. 17, 1944.  C. L. GILBERT  2,360,415
RECLOSURE CARTON
Filed June 14, 1943   4 Sheets-Sheet 1
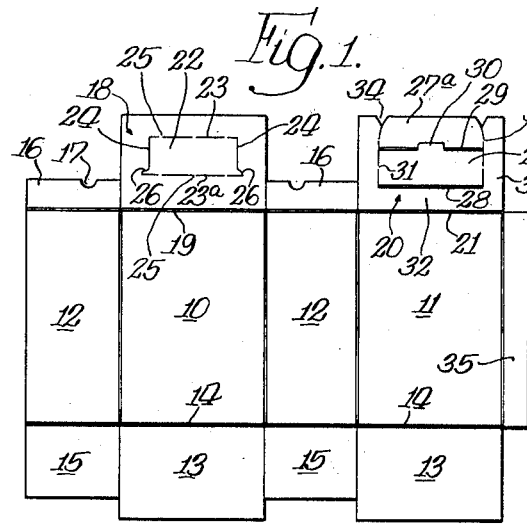
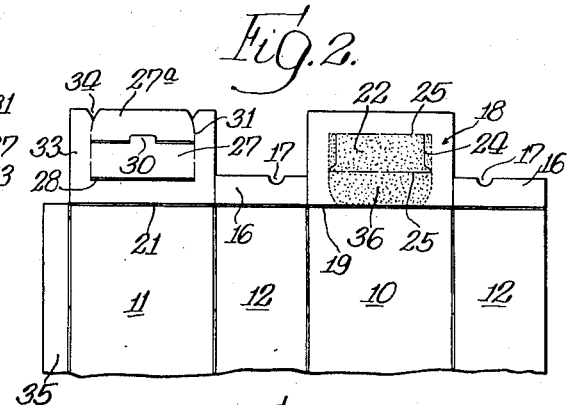
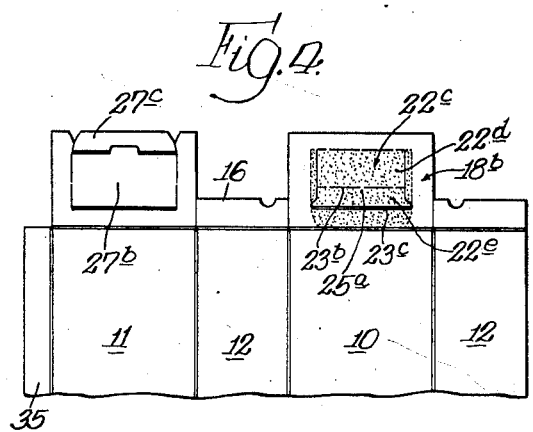
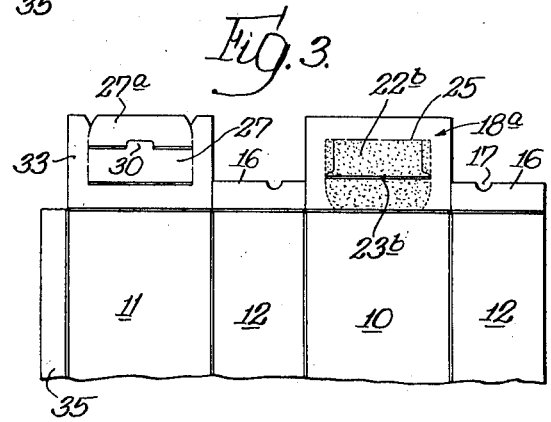
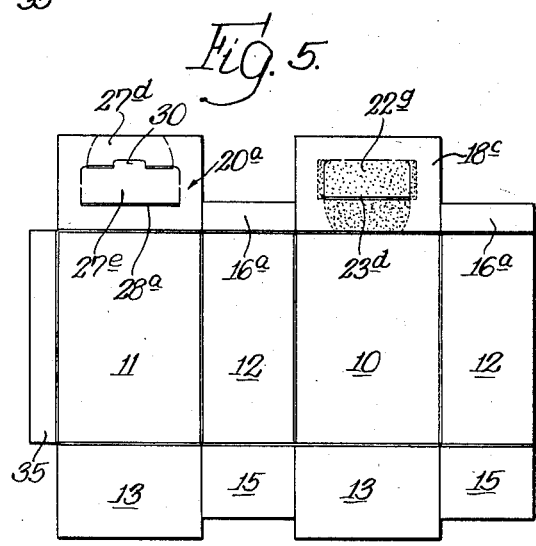
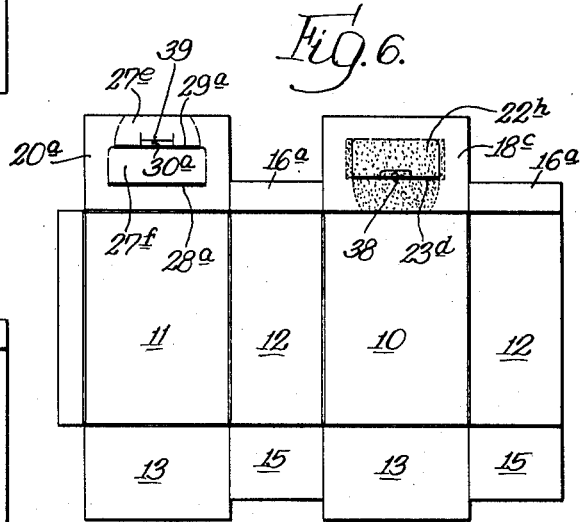
INVENTOR.
Clyde L. Gilbert,
BY
Brown, Jackson, Boettcher & Dienner
Attys Oct. 17, 1944.  C. L. GILBERT  2,360,415
RECLOSURE CARTON
Filed June 14, 1943    4 Sheets-Sheet 2
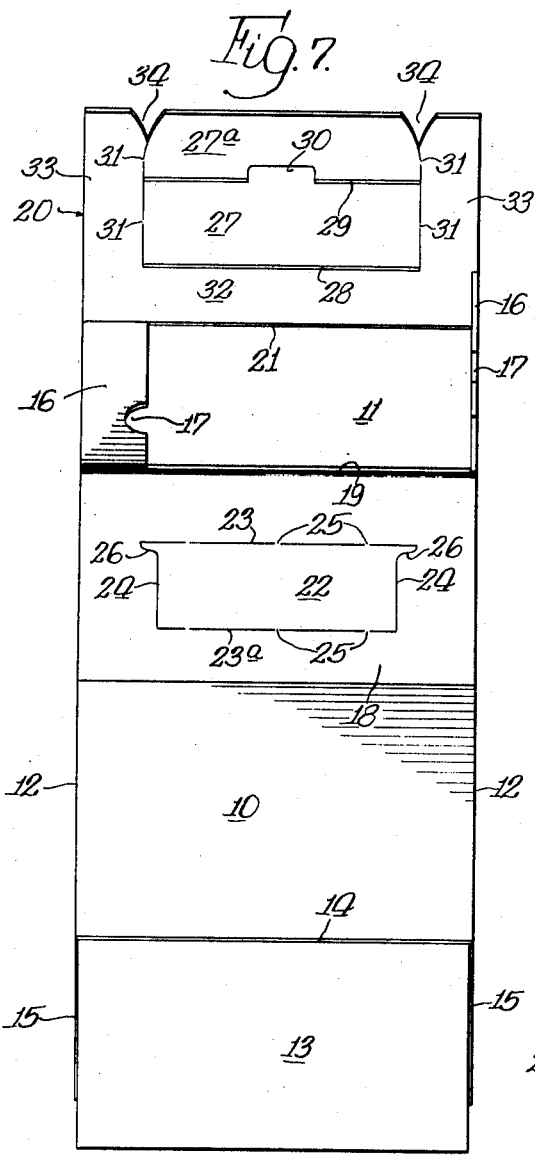
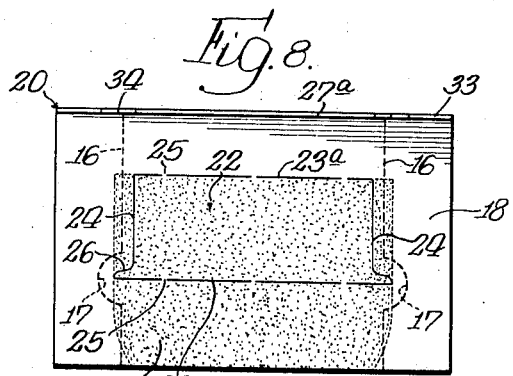
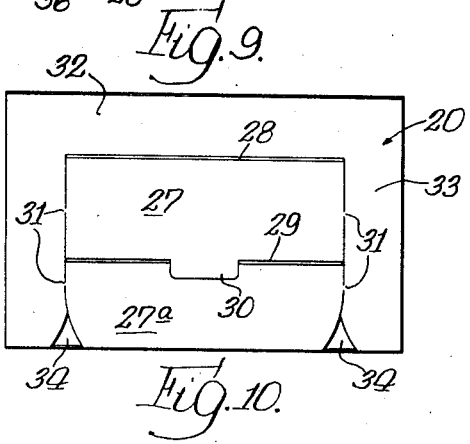
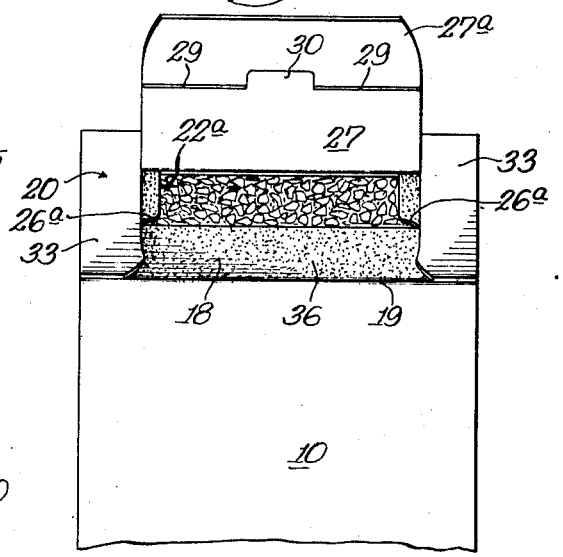
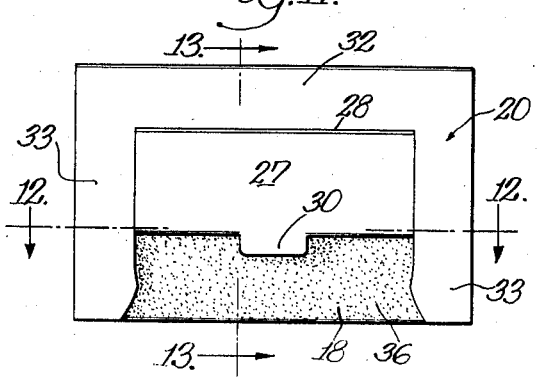
INVENTOR.
Clyde L. Gilbert,
BY
Brown, Jackson, Boettcher & Dienner
Atty's Oct. 17, 1944.     C. L. GILBERT     2,360,415
RECLOSURE CARTON
Filed June 14, 1943     4 Sheets-Sheet 3
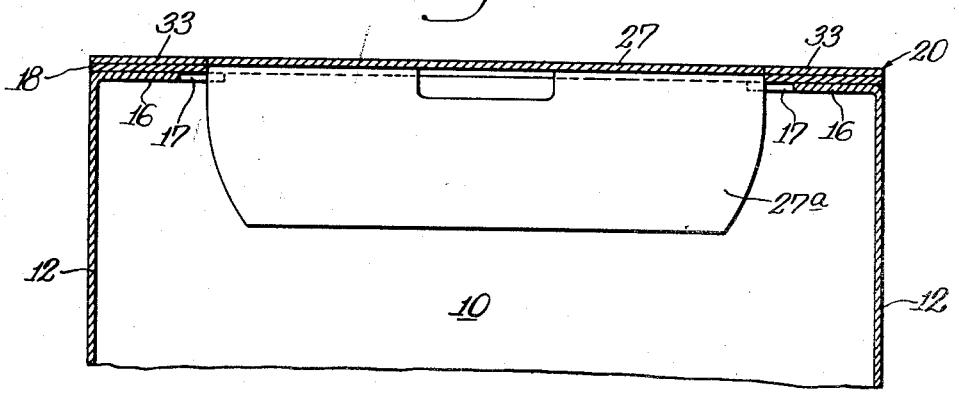
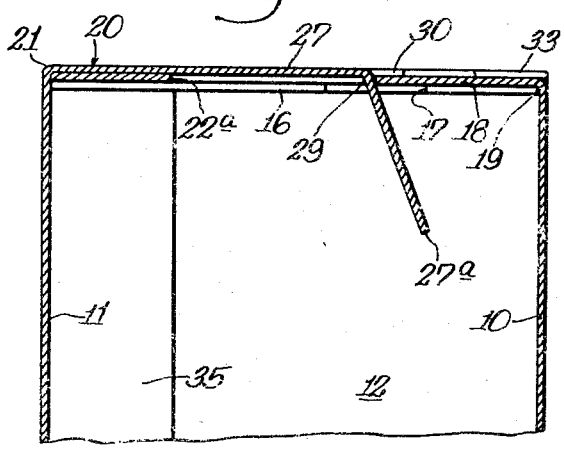
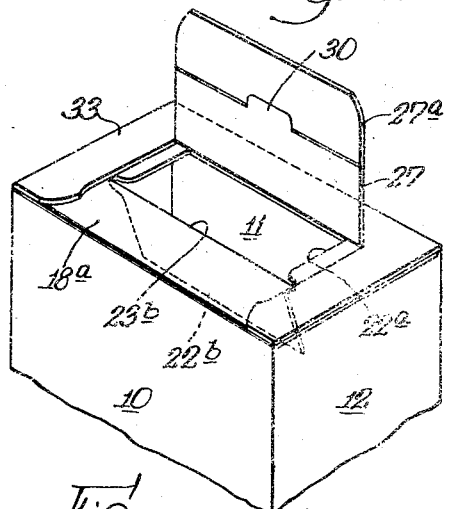
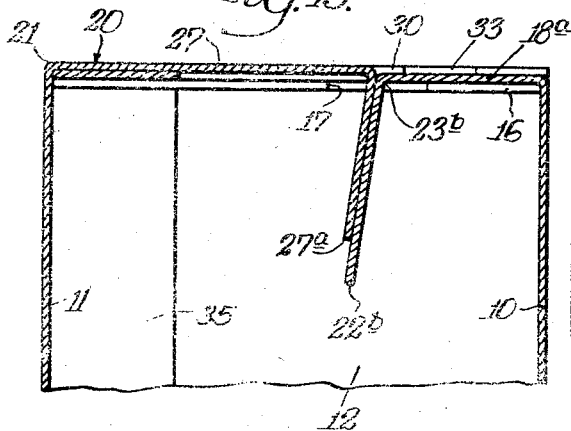
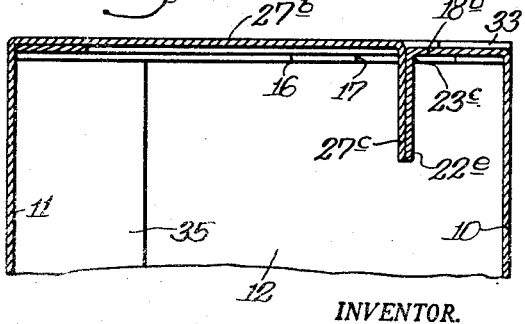
INVENTOR.
Clyde L. Gilbert,
BY
Brown, Jackson, Boettcher & Dienner
Attys.

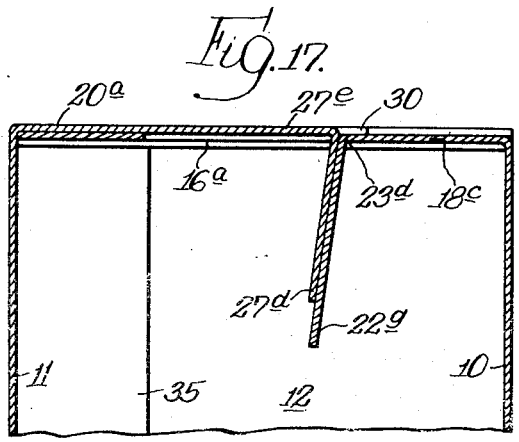
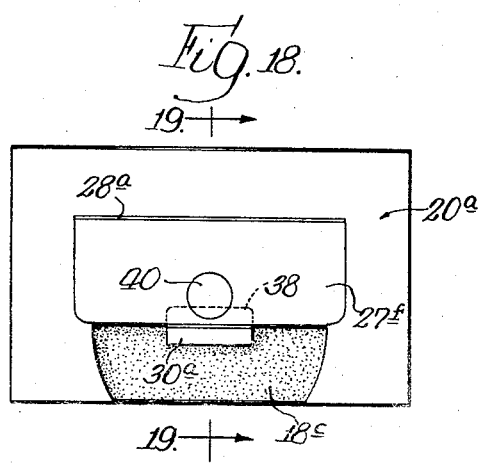
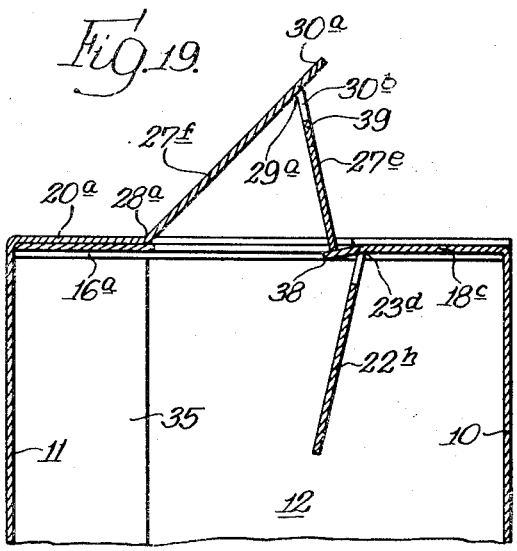
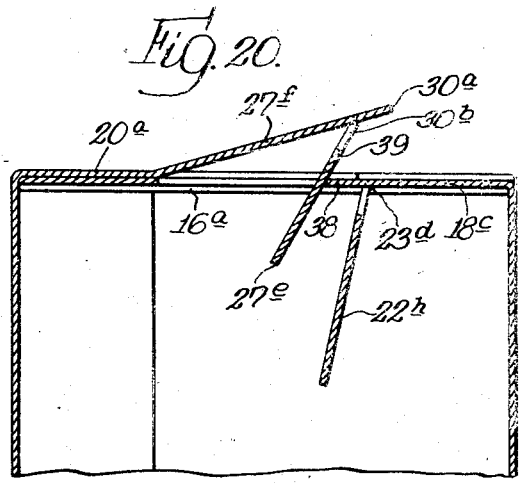
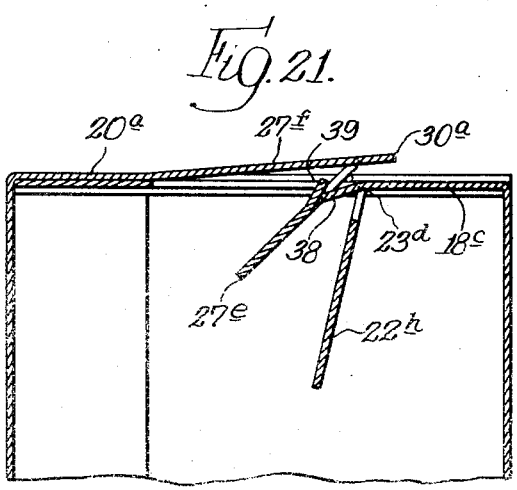
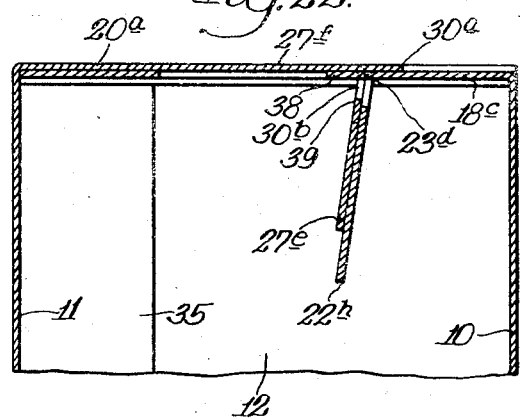

Patented Oct. 17, 1944

2,360,415

UNITED STATES PATENT OFFICE 2,360,415

RECLOSURE CARTON

Clyde L. Gilbert, Elkhart, Ind., assignor to American Coating Mills, Inc., Elkhart, Ind., a corporation of Indiana Application June 14, 1943, Serial No. 490,741

5 Claims. (Cl. 229—17)

This invention relates to cartons for containing various substances, and has to do more particularly with cartons of the reclosure type, that is, provided with means for effectively closing the carton after the same has been opened and a part of the contents thereof has been dispensed.

Reclosure cartons are known and are used for packaging various substances for domestic use, such as soap flakes, sugar, cocoa, etc. In such reclosure cartons as I am familiar with, the structure is unnecessarily complicated and the means for effecting reclosing of the carton after initial opening thereof often is difficult of access, when in its closed position, for movement to open position. My invention is directed to a reclosure carton of comparatively simple and inexpensive construction and in which the reclosure means or member is readily accessible, when in closed position, for movement into open position. More specifically, I provide the outermost end closure flap, at the upper end of the carton, with a reclosure member cut therefrom and arranged with its free edge substantially coincident with the front edge of the flap, whereby this reclosure member is readily accessible for initial opening thereof, and form the reclosure member in two parts, one a reclosure member proper and the other a retaining tongue or flap for holding that member in closed position, there preferably being a tab provided to facilitate withdrawal of the flap and opening of the reclosure member. I also provide means cooperating with the reclosure member in a manner to assure a leak-proof closure for the carton and, in certain cases, means for latching the reclosure member in its closed position. Further objects and advantages of my invention will appear from the detail description.

In the drawings—

Figure 1 is an inner face view of a blank for producing a carton embodying my invention;

Figure 2 is an outer face view of the blank of Figure 1, with the lower portion thereof broken away;

Figure 3 is a view similar to Figure 2, of a blank for a modified form of carton embodying my invention;

Figure 4 is a view similar to Figure 2, of a blank for a second modified form of carton embodying my invention;

Figure 5 is an outer face view of a blank for a third modified form of carton embodying my invention;

Figure 6 is a view similar to Figure 5, of a blank for a fourth modified form of carton embodying my invention;

Figure 7 is an isometric front view of a reclosure carton embodying my invention, produced from the blank of Figures 1 and 2, in partially setup condition;

Figure 8 is a plan view of the carton of Figure 7 in fully setup condition except that the outermost top closure flap is in vertical position;

Figure 9 is a view similar to Figure 8 but with the outermost top closure flap secured in its closed position;

Figure 10 is an isometric front view of the upper portion of the carton of Figure 9 with the reclosure flap in open position and the removable panel element of the inner top flap removed;

Figure 11 is a top plan view of the carton of Figure 10 with the reclosure flap in the position which it occupies after initial opening thereof followed by reclosing of the carton;

Figure 12 is a sectional view, on an enlarged scale, taken substantially on line 12—12 of Figure 11, through the upper end portion of the carton;

Figure 13 is a sectional view, on an enlarged scale, taken substantially on line 13—13 of Figure 11, through the upper end portion of the carton;

Figure 14 is an isometric side view of a carton produced from the blank of Figure 3, after opening thereof and with the reclosure flap in open position, with the lower portion of the carton broken away;

Figure 15 is a sectional view similar to Figure 13, on an enlarged scale, of the carton of Figure 14;

Figure 16 is a central vertical sectional view, taken from front to back and on an enlarged scale, of the upper portion of a carton produced from the blank of Figure 4, with the reclosure flap in closed position;

Figure 17 is a view similar to Figure 16, of a carton produced from the blank of Figure 5;

Figure 18 is a plan view of a carton produced from the blank of Figure 6, on an enlarged scale, with the reclosure flap closed;

Figure 19 is a sectional view, on an enlarged scale, through the upper portion of the carton of Figure 18, taken substantially on line 19—19 of Figure 18, but showing the positions of the parts at the start of the operation of closing the reclosure flap;

Figures 20 and 21 are views similar to Figure 19, showing steps in the closing of the reclosure member; and Figure 22 is a view similar to Figure 19, but with the reclosure member in its fully closed position.

In producing the cartons of my invention, I first print upon a sheet of cardboard, boxboard, or other appropriate material, at the face thereof which is to become the exterior surface of the respective cartons and in areas corresponding to the blanks from which the cartons are to be formed, desired matter such as the name of the product, the manufacturer or seller thereof, instructions for its use, etc. I preferably use foldable boxboard, which possesses considerable strength and resiliency, for reasons which will appear later. The printed sheet is then cut and scored or creased, by suitable dies, into blanks foldable into shape to produce the desired cartons.

The carton of Figures 7 to 13, inclusive, is formed from the blank of Figure 1, cut from a sheet of boxboard as above described. In describing this blank, and other blanks to be considered later, and with a view to avoiding confusion, I shall refer to the various elements thereof with respect to the positions which such elements normally occupy in the completely setup and closed carton. The blank comprises front and back panels 10 and 11, respectively, two side panels 12, one connecting panels 10 and 11 and the other attached to the outer edge of panel 10, front and back bottom closure flaps 13 attached to the lower ends of panels 10 and 11, and side bottom closure flaps 15 connected to the lower ends of side panels 12. Relatively narrow side top closure flaps 16 are connected to the upper ends of side panels 12, each provided a short distance from its front end with an arcuate recess 17 opening through its inner edge. An inner top closure flap 18 is connected at its forward edge to the upper end of front panel 10, along a score or crease providing a fold line 19, and an outer top closure flap 20 is connected at its rearward edge to the upper end of back panel 11 along a fold 21. Flap 18 is provided with a detachable closure panel 22 of substantially rectangular shape, defined by cuts 23 and 23ª, and 24. The cuts 23 and 23ª are interrupted by uncut elements 25 of slight width, commonly termed "nicks" in this art, connecting panel 22 to flap 18. The cut 23ª is somewhat longer than cut 23 and is connected at its ends, by short cuts 26 of compound curvature, to the cuts 24, providing a closure 22 with restricted terminals, for a purpose which will appear later. Closure flap 20 is cut to provide a reclosure flap 27, connected at its rearward edge to flap 20 along a fold line 28 and having an extension or tuck flap 27ª connected to its opposite edge along a fold line 29 interrupted by a tab 30 cut from flap 27ª. The reclosure flap 27 and the tuck flap 27ª are nicked at 31 to the surrounding portion of flap 20, which surrounding portion is of substantially U-shape, comprising a bight portion 32 and arms 33 extending therefrom. The outer corners of tuck flap 27ª and the adjacent corners of arms 33 are rounded as shown, by substantially V-shaped notches 34 cut therebetween. The reclosure flap 27 is of somewhat greater length than the removable panel 22, corresponding in length to cut 23ª, and fold line 29 is aligned with cut 23. Each of the flaps 18 and 20 corresponds in length to the width of the front and the back panels 10 and 11, which are of the same width, and in length to the width of the side panels 12, which are also of the same width. The blank is further provided with a relatively narrow glue lap 35 connected to the outer edge of back panel 11, and is appropriately creased or scored to provide fold lines between the side panels 12 and the connected bottom and top closure flaps 15 and 16, between the front and back panels 10 and 11 and the connected bottom closure flaps 13, and between back panel 11 and glue lap 35. The area of the upper or outer face of flap 18 corresponding to the reclosure flap 27 and the extension or tuck flap 27ª thereof, including panel 22, is provided with a coating 36 (Figure 2) of varnish, ink or other suitable substance repellent to the glue or other adhesive used for securing the top closure flaps together. Conveniently, the coating 36 is applied when printing upon the sheet of boxboard preliminary to cutting it into the blanks, but this coating may be applied at any other suitable time, as a separate operation, if desired or where conditions require it.

In constructing the carton from the blank, glue lap 35 is folded over onto the inner face of back panel 11, the exposed face of glue lap 35 is coated with glue or other suitable adhesive, and front panel 10 and side panel 12 carried thereby are folded over onto the other side panel 12 and back panel 11, with the side panel 12 carried by front panel 10 seating at its free edge portion upon the adhesive coated surface of glue lap 35. The parts are then held in position, under appropriate pressure, until the adhesive has set, securing the elements of the body of the carton together. After that has been done, the body of the carton is set up on a suitable block or mandrel, with the side panels perpendicular to the back or front panels. The upper surfaces of the side top flaps 16 are coated with glue or other suitable adhesive, as are the upper surface of the inner top flap 18 and the under surface of the outer top flap 20, and the flaps 16, 18 and 20 are then folded into superposed relation, in the order named, in which they are held under appropriate pressure, until the adhesive has set. That closes the upper end of the carton, which is then removed from the mandrel and is inverted and charged or loaded through its still open lower end, such loading preferably being effected by means of an automatic loading machine, as is known. Upon completion of the loading operation, the under faces of the bottom side closure flaps 15 are coated with an adhesive, as are the lower face of the bottom closure flap 13 connected to the back panel 11 and the upper face of the bottom closure flap 13 connected to front panel 10, after which the flaps 15, the flap 13 connected to panel 11 and the flap 13 connected to panel 10, are folded into superposed relation in the order named, in which they are held under appropriate pressure until the adhesive has set, completing closing of the carton. Due to the provision of the coating 36 on the upper surface of top flap 18, the adhesive applied to the under surface of reclosure flap 27 and extension 27ª thereof is substantially ineffective for securing these parts to flap 18 within the area 36 thereof. After the upper end of the carton has been closed, and the carton has been charged and the lower end thereof has been closed, in the manner above described, the top of the carton appears as in Figure 9, with top closure flap 20 overlying the flaps 16 and 18 and all of the flaps adhesively secured together, but with the reclosure flap 27 and the tuck flap 27ª thereof readily separable from flap 18, though weakly held thereto by the adhesive so as to be retained in position within the plane of flap 20. In order to open the carton, the reclosure flap 27 and tuck flap 27ᵃ are released from flaps 20 and 18, conveniently by insertion of a knife blade between them, from the front of the carton, thus freeing the reclosure flap 27 and tuck flap 27ᵃ from flap 18 and, at the same time, severing the nicks 31. Reclosure flap 27 may then be swung upward about fold line 28 into substantially vertical position and the panel 22 may be removed, by subjecting it to downward and inward pressure, leaving opening 22ᵃ through flap 18, located between the side top flaps 16, for discharge of the contents of the carton, as shown in Figure 10.

In order to reclose the carton, tuck flap 27ᵃ is bent downward along fold line 29, into position substantially perpendicular to reclosure flap 27, tuck flap 27ᵃ then being disposed for insertion through opening 22ᵃ, at the front thereof. When the panel 22 is removed, the opening 22ᵃ comprises two forwardly converging slot-like extensions 26ᵃ disposed at the forward corners of opening 22ᵃ. When the reclosure flap 27 is closed, tuck flap 27ᵃ extends, at its end portions, through the slot elements 26ᵃ so as to fit snugly therein and be held frictionally in position, holding the reclosure flap 27 closed. The arcuate recesses 17 in the side top flaps 16 are disposed to accommodate the end portions of tuck flap 27ᵃ, as will be clear from Figures 8, 12 and 13. The positions of the reclosure flap 27 and associated parts, after reclosing of the carton, are shown in Figures 11, 12 and 13. After the tuck flap 27ᵃ has been bent into position perpendicular to reclosure flap 27, the tab 30 projects from the forward edge of reclosure flap 27 and provides the means for withdrawing tuck flap 27ᵃ from its inserted position shown in Figures 12 and 13, for the purpose of swinging reclosure flap 27 to its raised or open position and again uncovering the opening 22ᵃ for discharge of the contents of the carton, as desired.

The material from which the carton is formed possesses considerable resiliency, such that the tuck flap 27ᵃ is yieldingly urged toward its original position in alignment with the reclosure flap 27. Accordingly, in the closed position of the reclosure flap 27, the tuck flap 27ᵃ is held in close contact with the adjacent edge of cover flap 18, forming therewith a closure effective to prevent escape of the contents of the carton, the end portions of the reclosure flap 27 seating upon the underlying areas of flap 18 forming, in conjunction with the arms 33 of flap 20, between which arms the reclosure flap 27 fits snugly, closures at the ends of the reclosure flap effectively sealed against escape of the contents of the carton. The end portions of the tuck flap 27ᵃ fit in the tapering extensions 26ᵃ of opening 22ᵃ sufficiently tightly to provide friction lock means for holding the reclosure flap 27 closed against casual displacement. In that manner, the reclosure flap 27 and the tuck flap 27ᵃ cooperate with the flaps 18 and 20 and associated parts for effectively securing the reclosure flap in its closed position and in a manner to prevent escape of the contents of the carton, while permitting opening of the reclosure flap with expedition and facility.

The carton of Figures 14 and 15 is produced from the blank of Figure 3. This blank is similar to that of Figures 1 and 2, except that the panel 22ᵇ is connected at its forward edge to flap 18ᵃ along a fold line 23ᵇ. The blank of Figure 3 is secured together and set up and closed at its upper end, and is then charged and closed at its lower end, as before. In opening the carton, reclosure flap 27 and tuck flap 27ᵃ are separated from flap 18ᵃ and swung upward, and panel 22ᵇ is then forced downward, breaking the nicks 25, assuming substantially its position shown in Figure 14, in which it is hinged at its upper edge to flap 18ᵃ, at the front of opening 22ᵃ, and extends therefrom downward and inward of the carton. In reclosing the carton, the tuck flap 27ᵃ, disposed substantially perpendicular to flap 27, is inserted through the front of opening 22ᵃ. As it is inserted downward through opening 22ᵃ, tuck flap 27ᵃ displaces panel 22ᵇ toward the front of the carton. In the fully closed position of reclosure flap 27, shown in Figure 15, the opposed faces of tuck flap 27ᵃ and of panel 22ᵇ are held tightly together, by the inherent resiliency of the material from which the carton is formed, which urges tuck flap 27ᵃ toward the front of the carton and panel 22ᵇ toward the rear of the carton. That provides a tight closure effective for preventing leakage of the carton contents between the forward edge of reclosure flap 27 and flap 18ᵃ. Also, the pressure contact between tuck flap 27ᵃ and panel 22ᵇ provides friction means, supplementing the friction contact between tuck flap 27ᵃ and flap 18ᵃ, for holding reclosure flap 27 closed. The carton of Figures 14 and 15 is otherwise similar to the carton of Figures 7 to 13, inclusive, and need not be further described here.

The carton of Figure 16 is produced from the blank of Figure 4. This blank is generally similar to that of Figure 3. The panel 22ᶜ is of increased width and is divided by a cut 23ᵇ, interrupted by nicks 25ᵃ, into a relative wide main section 22ᵈ and a relatively narrow sub-section 22ᵉ, connected to panel 18ᵇ along a fold line 23ᶜ. Reclosure flap 27ᵇ corresponds in width to panel 22ᶜ, and tuck flap 27ᶜ corresponds in width to sub-section 22ᵉ of panel 22ᶜ. In opening this carton, portion 22ᵈ of panel 22ᶜ is completely removed, leaving portion 22ᵉ hinged to flap 18ᵇ. When the carton is reclosed, the panel section 22ᵉ is held in close contact with tuck flap 27ᶜ, as in Figure 16. It will be noted that flap section 22ᵉ extends downward into the carton a considerably less distance than the panel 22ᵇ of Figure 15. The carton of Figure 16 is particularly suitable for large sizes, and for packaging chemicals or other substances which might be adversely affected by the adhesive-repellent coating on the removable panel, or where it is desired to have a wide opening for removal of the contents of the carton. The construction of the carton of Figure 16 is otherwise similar to that of Figure 15, and need not be further described here.

The carton of Figure 17 is produced from the blank of Figure 5. This blank is generally similar to the blank of Figures 1 and 2, but differs therefrom in certain respects. Panel 22ᵍ of flap 18ᶜ, connected thereto at its front edge along fold line 23ᵈ is cut straight at each side and is rounded at its rear corners, as shown. Tuck flap 27ᵈ of reclosure flap 27ᵉ, connected to flap 20ᵃ along fold line 28ᵃ, has each end rounded for its full extent and corresponds in length, at its inner edge, to the front edge of panel 22ᵍ. The side top closure flaps 16ᵃ correspond in width to the areas of flap 18ᶜ at the ends of panel 22ᵍ and, since the maximum length of tuck flap 27ᵈ corresponds to the distance between the inner edges of flaps 16ᵃ in the setup carton, are not notched out from their inner edges. When the carton has been opened and reclosed, tuck flap 27ᵈ is held closed by friction contact with the edges of flaps 16ᵃ and 18ᶜ and is also held in close contact with panel 22ᵍ, in the same manner as tuck flap 27ᵃ is held in contact with panel 22ᵇ of the carton of Figure 15, and for the same purpose. The carton of Figure 17 is otherwise similar to that of Figure 15 and requires no further description.

The carton of Figures 18 to 22, inclusive, is produced from the blank of Figure 6. This blank is similar to that of Figure 5, except that panel 22ʰ is cut at its forward edge to provide a latching tab 38 connected to flap 18ᶜ along a portion of the fold line 23ᵈ and rounded at its rearward corners, and tuck flap 27ᵉ is cut to provide a square cornered thumb tab 30ᵃ, connected to reclosure flap 27ᶠ along a portion of the fold line 29ᵃ, and an opposed latch tongue 39 carried by tuck flap 27ᵉ. The blank of Figure 6 is set up and secured together to produce the carton, which is then loaded and closed in the manner previously explained. When the carton has been opened and reclosed, it appears in top view as in Figure 18.

In the reclosing operation, tuck flap 27ᵉ bends latching tab 38 downward, as in Figure 19. That deflects tuck flap 27ᵉ downward and inward of the carton so that it passes off of tab 38, which is returned by the inherent resiliency of the material of the carton to its normal horizontal position of Figure 20, and the tuck flap 27ᵉ moves downward at an inclination in contact with the rear edge of tab 38 as the closing operation continues, as shown in this figure. As downward movement of tuck flap 27ᵉ continues, the distance between latching tab 38 and reclosure flap 27ᶠ decreases, with increasing resistance by tuck flap 27ᵉ to rearward displacement thereof. When latching tab 38 contacts latch tongue 39, the latter is bent slightly rearward relative to tuck flap 27ᵉ, and latching tab 38 is bent slightly downward, the parts then being in their positions shown in Figure 21. In the final stage of the reclosing operation, the reclosure flap should be moved downward by pressure exerted at the area indicated by the circle 40 of Figure 18. That moves latch tongue 39 into position to release latching tab 38, which then snaps upward through the opening 30ᵇ provided by cutting of the thumb tab 30ᵃ, and at the same time latch tongue 39 snaps forward into its normal position in the plane of tuck flap 27ᵉ, the latter swinging forward into pressure contact with panel 22ʰ. The final closing is evidenced by a clearly audible click, as the parts snap into position.

When the reclosure flap 27ᶠ is in its full closed position, the parts occupy their positions shown in Figure 22. The latching tab 38 is then in contact with the under face of reclosure flap 27ᶠ and thumb tab 30ᵃ is in contact with the upper face of flap 18ᶜ, providing a tight closure adjacent the opening 30ᵇ effectively preventing leakage of the contents of the carton at that area. The contacting tuck flap 27ᵉ and panel 22ʰ further contribute to prevention of leakage at the front edge of reclosure flap 27ᶠ and also assist in frictionally holding this flap closed. The latch means reduces likelihood of the reclosure flap 27ᶠ opening to an appreciable extent, thereby guarding against spillage of the contents of the carton if it is inverted or dropped. In order to reopen the carton, the reclosure flap is swung upward into its open position, by grasping the thumb tab 30ᵃ, in an obvious manner.

In the cartons of Figures 7 to 16, inclusive, when the reclosure flap is in closed position, the thumb tab 30 seats upon the upper face of the closure flap attached to the front panel, providing therewith a seal effective for preventing leakage of the contents of the carton through the opening in the tuck flap provided by cutting therefrom of the thumb tab.

The blanks of Figures 5 and 6, from which the cartons of Figure 16 and of Figures 17 to 22, inclusive, are produced, are not notched out at 34, as are the blanks of Figures 1 to 4, inclusive, as previously noted. That is advantageous in that the blanks of Figures 5 and 6 may be cut straight across end to end, saving waste, which is an important consideration in this art. In Figure 6 I have shown the thumb tab 30ᵃ as connected to reclosure flap 27ᶠ along a portion of the fold line 29ᵃ, and the latching tab 38 as connected to flap 18ᶜ along a portion of fold line 23ᵈ. That is not essential to my invention, however, and the fold lines at those areas may be omitted if desired.

It will be understood, as above indicated, that changes in details of construction and arrangement of parts of my invention may be resorted to, without departing from the field and scope thereof, and I intend to include all such variations, as fall within the scope of the appended claims, in this application in which the preferred forms only of my invention have been disclosed.

I claim:

1. In a reclosure carton of the character described, a body closed at one end by a plurality of flaps secured together in superposed relation comprising an inner flap and an outer flap, said inner flap having an opening therethrough into the body and a panel hinged thereto at one edge of said opening yieldingly urged toward the latter, said outer flap comprising a reclosure flap hinged at one edge thereto and a tuck flap hinged to the opposite edge of said reclosure flap insertible through said opening at said one edge thereof and yieldingly urged toward said panel.

2. In a reclosure carton of the character described, a body closed at one end by a plurality of flaps secured together in superposed relation comprising an inner flap, said inner flap having a substantially rectangular opening therethrough into the body and a panel hinged thereto at one edge of said opening yieldingly urged toward the latter and of materially less width than said opening, said outer flap comprising a reclosure flap hinged at one edge thereto and a tuck flap of materially less width than said opening hinged to said reclosure flap at the opposite edge thereof insertible through said opening at said one edge thereof and yieldingly urged toward said panel.

3. In a reclosure carton of the character described, a body closed at one end by a plurality of flaps secured together in superposed relation comprising an inner flap and an outer flap, said inner flap having an opening therethrough into the body and a latching tab extending therefrom into said opening from one edge thereof, said outer flap comprising a reclosure flap hinged at one edge thereto and a tuck flap hinged to the opposite edge of said reclosure flap, the latter flap being disposed substantially in the plane of said outer flap and overlying and closing said opening and extending beyond the ends thereof in overlying relation to said inner flap with said tuck flap inserted through said opening at said one edge thereof when said reclosure flap is in reclosed position, said tuck flap comprising a latch tongue cooperating with said tab for restraining said tuck flap against withdrawal through said opening.

4. In a reclosure carton of the character described, a body closed at one end by a plurality of flaps secured together in superposed relation comprising an inner flap and an outer flap, said inner flap having an opening therethrough into the body and a latching tab extending therefrom into said opening from one edge thereof, said outer flap comprising a reclosure flap hinged at one edge thereto and a tuck flap hinged to the opposite edge of said reclosure flap and insertible through said opening at said one edge thereof, said tuck flap being cut to provide a thumb tab extending from said opposite edge of said reclosure flap and a latch tongue carried by said tuck flap and spaced from said reclosure flap by the opening from which said thumb tab was cut, said latch tongue cooperating with said latching tab for restraining said tuck flap against withdrawal through said opening.

5. In a reclosure carton of the character described, a body closed at one end by a plurality of flaps secured together in superposed relation comprising an inner flap and an outer flap, said inner flap having an opening therethrough into the body and being provided with a panel hinged thereto at one edge of said opening and a latching tab cut from said panel and extending inward of said opening at said one edge thereof, said outer flap comprising a reclosure flap hinged at one edge thereto and a tuck flap hinged to the opposite edge of said reclosure flap, said tuck flap being cut to provide a thumb tab extending from said opposite edge of said reclosure flap and a latch tongue carried by said tuck flap and spaced from said reclosure flap by the opening from which said thumb tab was cut, said latch tongue cooperating with said latching tab for restraining said tuck flap against withdrawal through said opening, said tuck flap and said panel being yieldingly urged in opposite directions and held in pressure contact when said tuck flap is inserted through said opening with said reclosure flap in closed position.

CLYDE L. GILBERT.